Feb. 15, 1927.
R. B. BEISEL
OIL TEMPERATURE REGULATOR
Filed Nov. 12, 1923
1,617,433
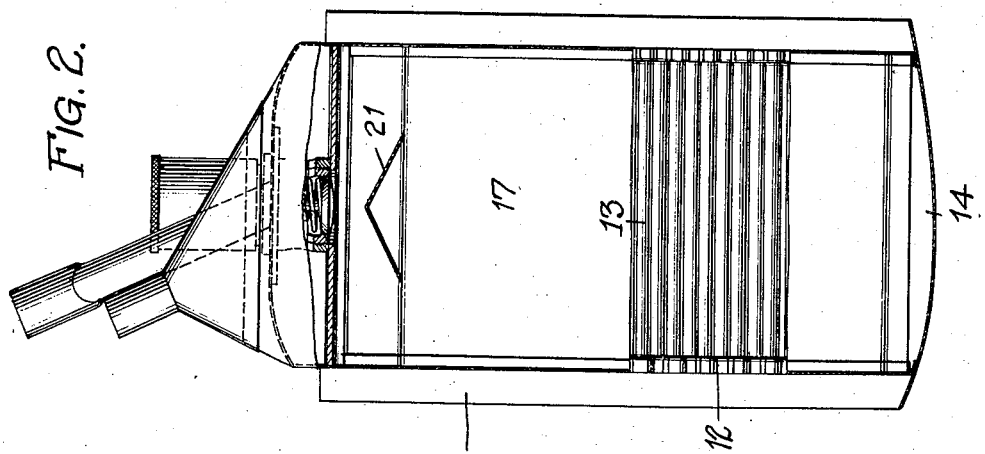
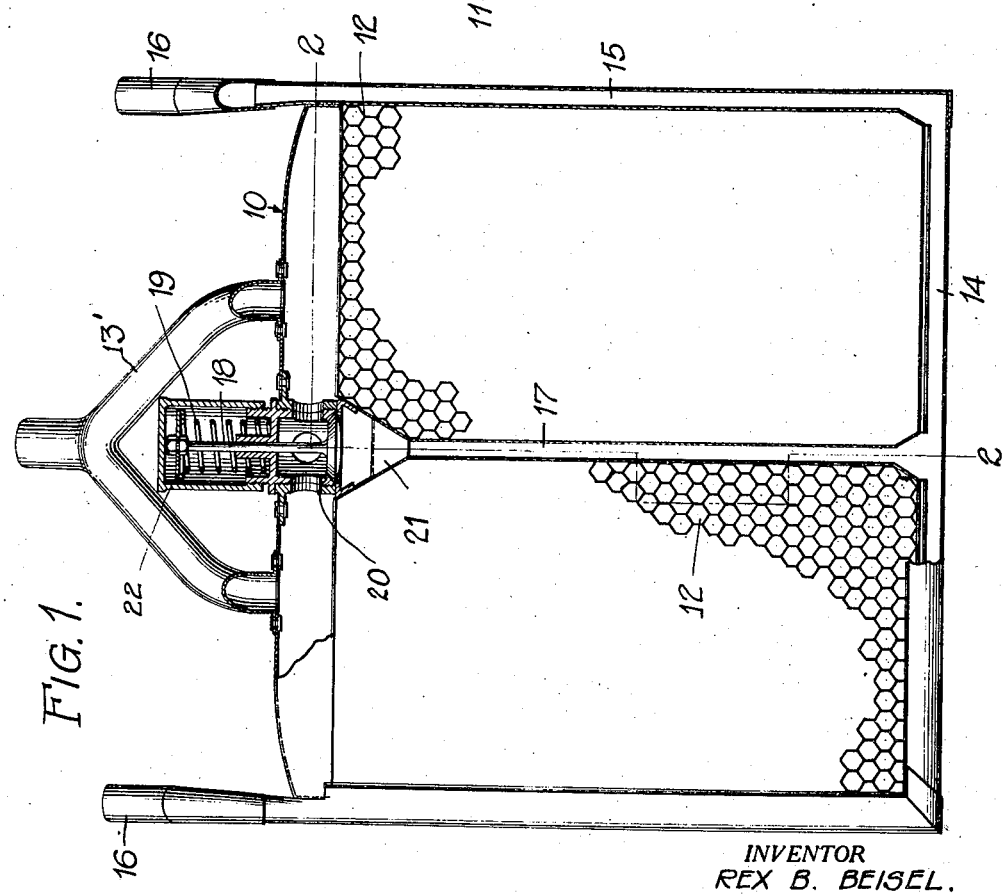
INVENTOR
REX B. BEISEL.
BY
ATTORNEY.

Patented Feb. 15, 1927.

1,617,433

UNITED STATES PATENT OFFICE.

REX B. BEISEL, OF GARDEN CITY, NEW YORK, ASSIGNOR TO CURTISS AEROPLANE AND MOTOR CO., INC., OF GARDEN CITY, LONG ISLAND, NEW YORK, A CORPORATION OF NEW YORK.

OIL-TEMPERATURE REGULATOR.

Application filed November 12, 1923. Serial No. 674,417.

My invention relates to oil temperature regulators for heat generating power plants.

The object of the invention is to so construct an oil temperature regulator that the oil in its circulation therethru is directed automatically through either of two oil passages according to its temperature condition and viscosity. These passages are respectively restricted and unrestricted. The restricted passage is so formed as to preclude the circulation of oil therethru except when heated, and at the same time, is so formed as to cool the oil during such circulation. The unrestricted oil passage, unlike the restricted oil passage, has associated with it a check valve. This valve, due to the pressure in the oil circuit acts automatically to open and close the unrestricted oil passage. Preferably the unrestricted oil passage, or bypass, is so related to the restricted or normal oil passage as to admit of an interchange of heat. Accordingly, the heated oil in the unrestricted oil passage, by reason of such heat transmission, is instrumental in promoting the circulation of the viscous oil in the restricted or normal passage. An oil temperature regulator thus characterized is especially useful as an internal combustion motor accessory. By interposing the oil temperature regulator in the oiling circuit of the motor the temperature condition of the oil or lubricant is at all times maintained at that temperature deemed most efficient for motor lubrication.

Other objects, advantages and improved results will be apparent from the following.

In the drawings, wherein, like reference characters denote like or corresponding parts, Fig. 1 is a face view of the oil temperature regulator, partly shown in transverse vertical section, and Fig. 2 is a section on the line 2—2 of Fig. 1.

The oil temperature regulator, while especially useful as an internal combustion motor accessory, is nevertheless useful in connection with other types of heat generating power plants in which oil is circulated under pressure for lubrication purposes. It is intended, in the preferred embodiment of the invention, that the oil temperature regulator, designated in its entirety as 10, shall be appropriately connected up and made to form a part of the oil circuit of the power plant in connection with which it is used. Only the oil temperature radiator per se is herein illustrated. Preferably it comprises an outer shell 11, the opposite faces of which are open as indicated. Within the shell 11, two separately formed cellular structures 12 are fastened, said structures being preferably of standard form, i. e., made up of a plurality of hex-end copper tubes 13, through which the cooling medium is adapted to flow. These cellular structures 12 properly encased and proportioned, constitute what I prefer to designate as the normal oil passage of the oil temperature regulator. By reason of its cellular form, the said normal oil passage is appropriately baffled or restricted.

The oil in its circulation enters the restricted oil passage through a Y-end oil duct 13' open at its branched end to the shell or casing 11, within which the cellular structures 12 are encased. Normally the oil due to its heated condition, flows down through the cellular structures 12 to points of discharge at the bottom of the casing, from which point the oil is led through a base duct 14 and side ducts 15 to return pipes 16 leading back to the power plant or motor in connection with which the oil temperature regulator is used. Preferably, the oil ducts 14 and 15 extend the full width of the casing 11 and throughout the bottom and side walls thereof lie contiguous to and in thermal contact with the corresponding walls of the cellular structures 12. Thus organized, the desired interchange of heat between the cellular structures and the said ducts 14 and 15 is established. So much for the flow of oil in its heated or highly fluid condition.

In addition to the cellular structures 12 which constitute the normal or restricted oil passage within the oil temperature regulator, said regulator is provided with a centrally disposed vertical oil duct 17, which I shall hereinafter refer to as an unrestricted oil passage. This passage 17, under normal operating conditions is closed at its upper end by a check valve 18 spring pressed as at 19 against a suitable valve seat 20. Said valve 18 operates automatically. Should the oil in circulation due to its viscosity cease to flow through the cellular structures 12, the valve 18, due to the pressure in the oil line will automatically open, whereupon the oil is free to enter the unrestricted passage 17 where its flow is unobstructed. The oil in its flow through the unrestricted passage 17, which like the bottom and side ducts 15, extends the full width of the casing, gradually raises the temperature of the congealed oil in the cellular structures 12, and as the oil in its unrestricted flow becomes hotter and hotter, the congealed oil in the cellular structures becomes less viscous until finally, due to heat radiation, flow is established in the restricted passage. Flow through the unrestricted oil passage having been thus established, the pressure on the valve 18 falls off until the spring 19 automatically closes the valve to thereby preclude a continued flow of oil through the unrestricted oil passage 17.

If desired, a baffle 21 may be provided within the unrestricted oil passage 17 to better distribute the oil therewithin. Moreover, to the end that the tension of the spring 19 may be adjusted, a disc 22 is adjustably mounted on the valve stem as a bearing surface for one end of said spring.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. In an oil temperature regulator, a circuit through which oil is circulated under pressure, a casing within said circuit, separate oil passages formed within said casing, said separate passages being respectively restricted and unrestricted, and a check valve for closing the unrestricted oil passage should the temperature condition of the oil admit of its flow through said restricted passage.

2. In an oil temperature regulator, a circuit through which oil is circulated under pressure, a casing within said circuit, separate oil passages formed within said casing, said separate passages being respectively restricted and unrestricted, and a check valve normally closing said unrestricted passage though automatically movable to open said passage should the temperature condition of the oil preclude its flow through said restricted passage.

3. In an oil temperature regulator, a circuit thru which oil is circulated under pressure, a casing within said circuit, separate oil passages formed within said casing, and a check valve automatically operable under the influence of the pressure of the oil within said circuit for directing the flow thereof thru one or the other of said passages according to the temperature condition and viscosity of the oil.

4. In an oil temperature regulator, a circuit through which oil is circulated under pressure, a radiator within said circuit, a by-pass within said circuit, and a check valve normally closing said by-pass, said valve being operable automatically under the influence of the oil pressure to by-pass the oil around the radiator should its viscosity preclude its flow therethru.

5. In an oil temperature regulator, a circuit through which oil is circulated under pressure, a radiator within said circuit, a by-pass within said circuit, said by-pass being in thermal contact with the walls of the radiator to admit of an interchange of heat, and a check valve normally closing said by-pass, said check being operable automatically under the influence of the oil pressure to by-pass the oil around the radiator should its viscosity preclude its flow therethru.

In testimony whereof I hereunto affix my signature.

REX B. BEISEL.